US012789820B2

(12) United States Patent
Sumner et al.

(10) Patent No.: US 12,789,820 B2
(45) Date of Patent: Nov. 10, 2026

(54) SYSTEMS AND METHODS FOR GENERATING DRIVING INFORMATION TO DEMONSTRATE A VEHICLE MANEUVER AND GUIDE AN OPERATOR

(71) Applicant: Toyota Research Institute, Inc., Los Altos, CA (US)

(72) Inventors: Emily Sarah Sumner, Mountain View, CA (US); Deepak Edakkattil Gopinath, Washington, DC (US); Jonathan A. DeCastro, Arlington, MA (US); Andrew Michael Silva, Cambridge, MA (US); Thomas M. Balch, Damariscotta, ME (US); Xiongyi Cui, Somerville, MA (US); Guy Rosman, Cambridge, MA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/925,244

(22) Filed: Oct. 24, 2024

(65) Prior Publication Data

US 2026/0116396 A1 Apr. 30, 2026

(51) Int. Cl.
*B60W 50/00* (2006.01)
*B60W 10/18* (2012.01)
(Continued)

(52) U.S. Cl.
CPC ........ *B60W 50/0097* (2013.01); *B60W 10/18* (2013.01); *B60W 10/20* (2013.01);
(Continued)

(58) Field of Classification Search
CPC .. B60W 50/0097; B60W 10/18; B60W 10/20; B60W 50/14; B60W 60/001;
(Continued)

(56) References Cited

U.S. PATENT DOCUMENTS

| | | | |
|---|---|---|---|
| 8,472,862 | B2 | 6/2013 | Yaskin et al. |
| 2017/0043789 | A1 | 2/2017 | Hecht |

(Continued)

FOREIGN PATENT DOCUMENTS

| | | | |
|---|---|---|---|
| CN | 102607570 | A | 7/2012 |
| CN | 110588663 | A | 12/2019 |

(Continued)

OTHER PUBLICATIONS

"Cui, Can; et. al.; Personalized Autonomous Driving with Large Language Models: Field Experiments; May 8, 2024; 2024 IEEE 27th International Conference on Intelligent Transportation Systems (ITSC)" (Year: 2024).*

(Continued)

*Primary Examiner* — Ramya P Burgess
*Assistant Examiner* — Christopher R Cardimino
(74) *Attorney, Agent, or Firm* — Christopher G. Darrow; Darrow Mustafa, PC

(57) ABSTRACT

Systems, methods, and other embodiments described herein relate to generating instructions using multiple models for maneuvering on a road according to an operator profile and adapting the instructions using multi-modal data. In one embodiment, a method includes generating an operator profile by a learning model using road history and an operator goal on a road during a driving scenario for a vehicle. The method also includes estimating a driving command using an automated driving system (ADS) and directions using a language model for the driving scenario. The method also includes communicating maneuvers for the road to an operator using the driving command, the directions, the operator profile, and a track profile.

20 Claims, 5 Drawing Sheets

(51) Int. Cl.

| | |
|---|---|
| ***B60W 10/20*** | (2006.01) |
| ***B60W 50/14*** | (2020.01) |
| ***B60W 60/00*** | (2020.01) |
| ***G06N 3/0895*** | (2023.01) |

(52) U.S. Cl.
CPC .......... *B60W 50/14* (2013.01); *B60W 60/001* (2020.02); *G06N 3/0895* (2023.01); *B60W 2540/30* (2013.01); *B60W 2552/05* (2020.02); *B60W 2556/10* (2020.02)

(58) Field of Classification Search
CPC ......... B60W 2540/30; B60W 2552/05; B60W 2556/10; G06N 3/0895
See application file for complete search history.

(56) References Cited

U.S. PATENT DOCUMENTS

| | | | | |
|---|---|---|---|---|
| 2020/0249683 | A1* | 8/2020 | Rosales | B60W 60/0011 |
| 2020/0254992 | A1 | 8/2020 | Langhorst | |
| 2020/0380389 | A1* | 12/2020 | Eldeeb | G06F 16/285 |
| 2022/0108054 | A1* | 4/2022 | Akhauri | G06F 30/27 |
| 2023/0036046 | A1 | 2/2023 | Tsuchiya et al. | |
| 2024/0059325 | A1* | 2/2024 | Rubin | B60W 60/0027 |
| 2024/0119932 | A1* | 4/2024 | Khorshid | G10L 15/22 |
| 2024/0135276 | A1 | 4/2024 | Parajuli et al. | |
| 2024/0185188 | A1 | 6/2024 | Chan et al. | |
| 2024/0371089 | A1* | 11/2024 | Yang | G06F 16/4393 |
| 2025/0085131 | A1* | 3/2025 | Dasher | G06T 19/00 |
| 2025/0093173 | A1* | 3/2025 | Sharifi | H04W 4/024 |
| 2025/0094390 | A1* | 3/2025 | Hettige | G06F 16/90332 |
| 2025/0201247 | A1* | 6/2025 | Gupta | G10L 15/22 |

FOREIGN PATENT DOCUMENTS

| | | | | | |
|---|---|---|---|---|---|
| CN | 111445764 | A | * | 7/2020 | G09B 9/04 |
| CN | 112215121 | A | | 1/2021 | |
| CN | 115329217 | A | | 11/2022 | |
| CN | 115482699 | A | | 12/2022 | |
| DE | 102020004796 | A1 | | 11/2020 | |
| EP | 3703037 | A1 | | 9/2020 | |
| KR | 102014544 | B1 | | 9/2019 | |
| WO | WO-2024174028 | A1 | * | 8/2024 | B60W 50/0097 |

OTHER PUBLICATIONS

"Chen, Long; et. al. Driving with LLMs: Fusing Object-Level Vector Modality for Explainable Autonomous Driving; Oct. 13, 2023; 2024 IEEE International Conference on Robotics and Automation (ICRA)" (Year: 2023).*

Wang et al., "Incorporating Voice Instructions in Model-Based Reinforcement Learning for Self-Driving Cars," NeurIPS 2021 Workshop on Machine Learning for Autonomous Driving, pp. 1-11.

Fuchs et al., "Super-Human Performance in Gran Turismo Sport Using Deep Reinforcement Learning," IEEE Robotics and Automation Letters (RA-L) 2021, and International Conference on Robots and Automation (ICRA) 2021, pp. 1-9.

* cited by examiner

SYSTEMS AND METHODS FOR GENERATING DRIVING INFORMATION TO DEMONSTRATE A VEHICLE MANEUVER AND GUIDE AN OPERATOR

TECHNICAL FIELD

The subject matter described herein relates, in general, to generating driving information for maneuvering a road, and, more particularly, to generating the driving information using multiple models for demonstrating and outputting guidance about a vehicle maneuver along the road.

BACKGROUND

Vehicles acquire sensor data that facilitate perceiving other vehicles, obstacles, pedestrians, and additional aspects of a surrounding environment. For example, a vehicle equipped with a light detection and ranging (LIDAR) sensor uses light to scan the surrounding environment and acquire LIDAR data. Computing logic associated with the LIDAR analyzes the LIDAR data to detect object presence and other features of the surrounding environment. In further examples, additional sensors such as cameras are implemented to acquire information about the surrounding environment from which a system derives detailed awareness about the surrounding environment. This sensor data can be useful in various circumstances for improving perceptions of the surrounding environment so that systems such as automated driving systems (ADS) can perceive the noted aspects for planning and navigating a road.

In various implementations, systems acquire sensor data from a vehicle to assist an operator during a vehicle trip for improving safety, comfort, etc. For instance, a driving scenario involves active assistance by an ADS helping the operator to follow and track a highway lane. This can include automatically maneuvering a vehicle upon a detected departure from the highway lane using the sensor data. Furthermore, passive assistance can involve a scenario where the ADS anticipates a rear-end collision and triggers an alarm for the operator to reduce speed. This can include pre-charging vehicle brakes that reduces a stopping distance and prevents the rear-end collision. However, active and passive assistance by an ADS can lack detailed feedback to the operator about learning a maneuver to primarily handle through manual controls during the vehicle trip (e.g., a particular road, course, etc.). Therefore, systems influencing an operator to improve driving skills and vehicle handling during the trip lack features for diverse driving scenarios.

SUMMARY

In one embodiment, example systems and methods relate to generating instructions using multiple models for maneuvering on a road according to an operator profile and adapting the instructions using multi-modal data. In various implementations, a vehicle automatically guided by an automated driving system (ADS) generates driving tasks during a driving scenario for increasing awareness by an operator. However, these systems can have limited data about operators and vehicle capabilities to integrate predictions and outputs from multiple models for a driving scenario that is complex. Furthermore, an operator hiring a professional coach for training to improve driving skills and handling for a particular vehicle and a specialized trip can be cost-prohibitive. Thus, systems generating instructions for an operator to follow on a vehicle trip involving complicated maneuvers can encounter difficulties that decrease effectiveness and limit performance.

Therefore, in one embodiment, a prediction system generates and communicates personalized information that mimics expert training to an operator for modifying driving. For example, the personalized information includes a driving command and directions computed by systems for the operator to navigate a road (e.g., a racetrack). Furthermore, the personalized information can include maneuvers for the road formed using the driving command, the directions, and an operator profile. In one approach, a learning model generates the operator profile using road history and an operator goal for the road. In this way, the prediction system improves driver competence and skill when traveling on the road while achieving goals such as reducing travel time and increasing fuel efficiency, thereby improving vehicle travel.

In one embodiment, a prediction system for generating instructions using multiple models for maneuvering on a road according to an operator profile and adapting the instructions using multi-modal data is disclosed. The prediction system includes a memory storing instructions that, when executed by a processor cause, the processor to generate an operator profile by a learning model using road history and an operator goal on a road during a driving scenario for a vehicle. The instructions also include instructions to estimate a driving command using an ADS and directions using a language model for the driving scenario. The instructions also include instructions to communicate maneuvers for the road to an operator using the driving command, the directions, the operator profile, and a track profile.

In one embodiment, a non-transitory computer-readable medium for generating instructions using multiple models for maneuvering on a road according to an operator profile and adapting the instructions using multi-modal data and including instructions that when executed by a processor cause the processor to perform one or more functions is disclosed. The instructions include instructions to generate an operator profile by a learning model using road history and an operator goal on a road during a driving scenario for a vehicle. The instructions also include instructions to estimate a driving command using an ADS and directions using a language model for the driving scenario. The instructions also include instructions to communicate maneuvers for the road to an operator using the driving command, the directions, the operator profile, and a track profile.

In one embodiment, a method for generating instructions using multiple models for maneuvering on a road according to an operator profile and adapting the instructions using multi-modal data is disclosed. In one embodiment, the method includes generating an operator profile by a learning model using road history and an operator goal on a road during a driving scenario for a vehicle. The method also includes estimating a driving command using an ADS and directions using a language model for the driving scenario. The method also includes communicating maneuvers for the road to an operator using the driving command, the directions, the operator profile, and a track profile.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with generating instructions using multiple models for maneuvering on a road according to an operator profile and adapting the instructions using multi-modal data are disclosed herein. In various implementations, systems coaching and training an operator about maneuvering a vehicle like a professional encounter limitations with generating effective and safe directions. In particular, systems can lack tailoring and personalization of directions that reduce helpfulness with improving a driving metric (e.g., extreme handling). Furthermore, an automated driving system (ADS) outputting a driving command can have few explanations about nuances during a maneuver (e.g., cornering) on a demo lap that pushes vehicle capabilities to design limits. Thus, systems have challenges with improving operator skill when driving on a road that mimics a professional driver.

Therefore, in one embodiment, a prediction system includes a mode that generates an operator profile using a learning model (e.g., a neural network) and estimates driving instructions that professionally direct an operator like an expert on a road. For example, the instructions modify a manner of driving during a driving scenario (e.g., a new track). In one approach, the prediction system receives information about a road history involving driving behavior for one or more operators on a road, track, etc., associated with the driving scenario. The prediction system can also receive an operator goal for the driving scenario, such as reducing drive time by a certain amount. Furthermore, personalizing the instructions includes communicating maneuvers for the road to an operator using a driving command, the directions, the operator profile, and a track profile. Here, the prediction system can estimate a driving command using an ADS and directions using a language model for the driving scenario. Personalization can include communicating in a manner that manipulates driving behavior verbally, audibly, etc. For instance, the language model manipulates the presentation of verbal instructions (e.g., a vehicle talking) specific to the operator for increasing persuasion. Accordingly, the prediction system trains an operator to drive as a professional and meet an operator goal using multiple models and information sources, thereby improving driving skills and enjoyment.

Figure 1:
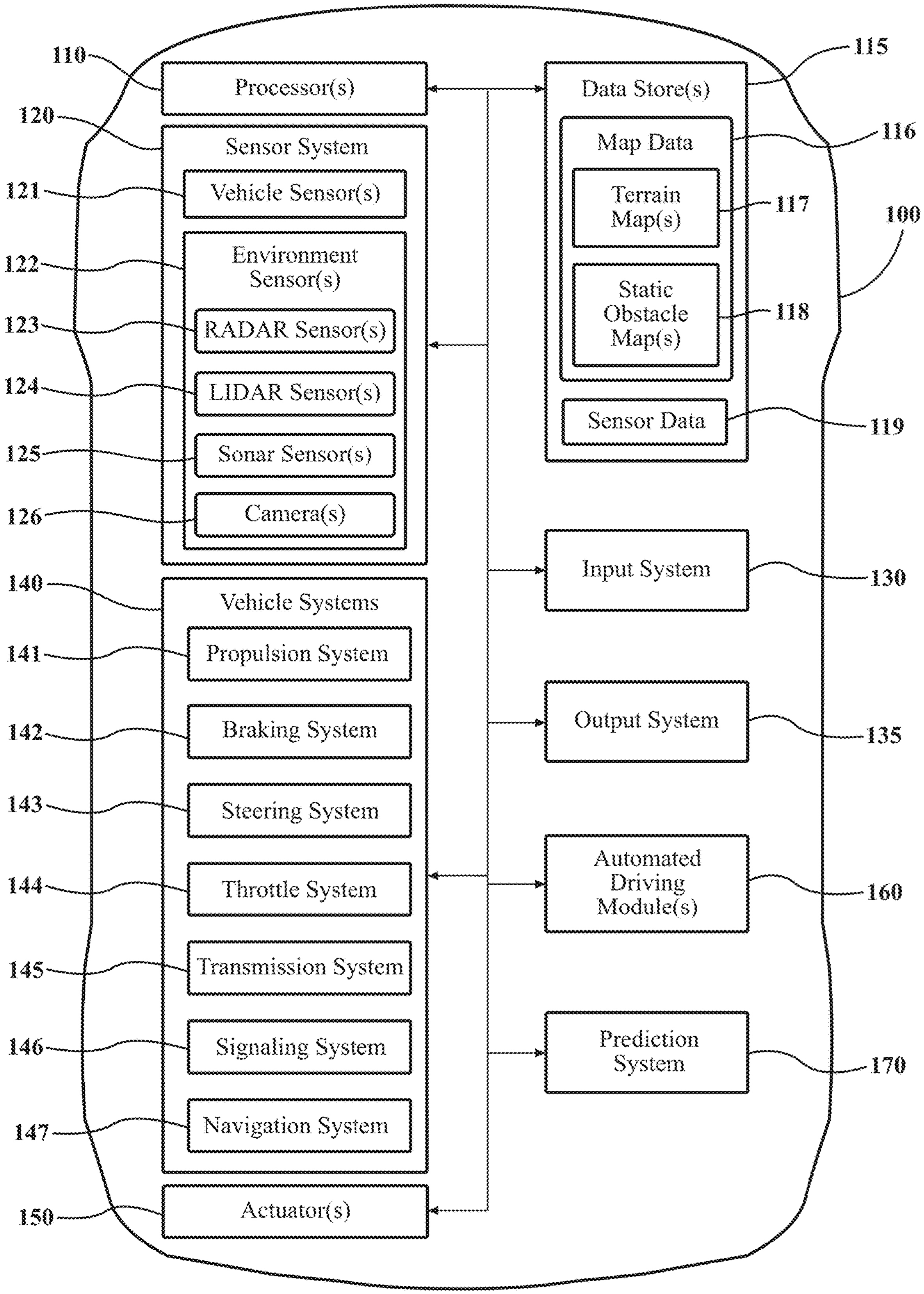
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a prediction system 170 uses road-side units (RSU), consumer electronics (CE), mobile devices, robots, drones, and so on that benefit from the functionality discussed herein associated with generating instructions using multiple models for maneuvering on a road according to an operator profile and adapting the instructions using multi-modal data.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a prediction system 170 that is implemented to perform methods and other functions as disclosed herein relating to generating instructions using multiple models for maneuvering on a road according to an operator profile and adapting the instructions using multi-modal data.

Figure 2:
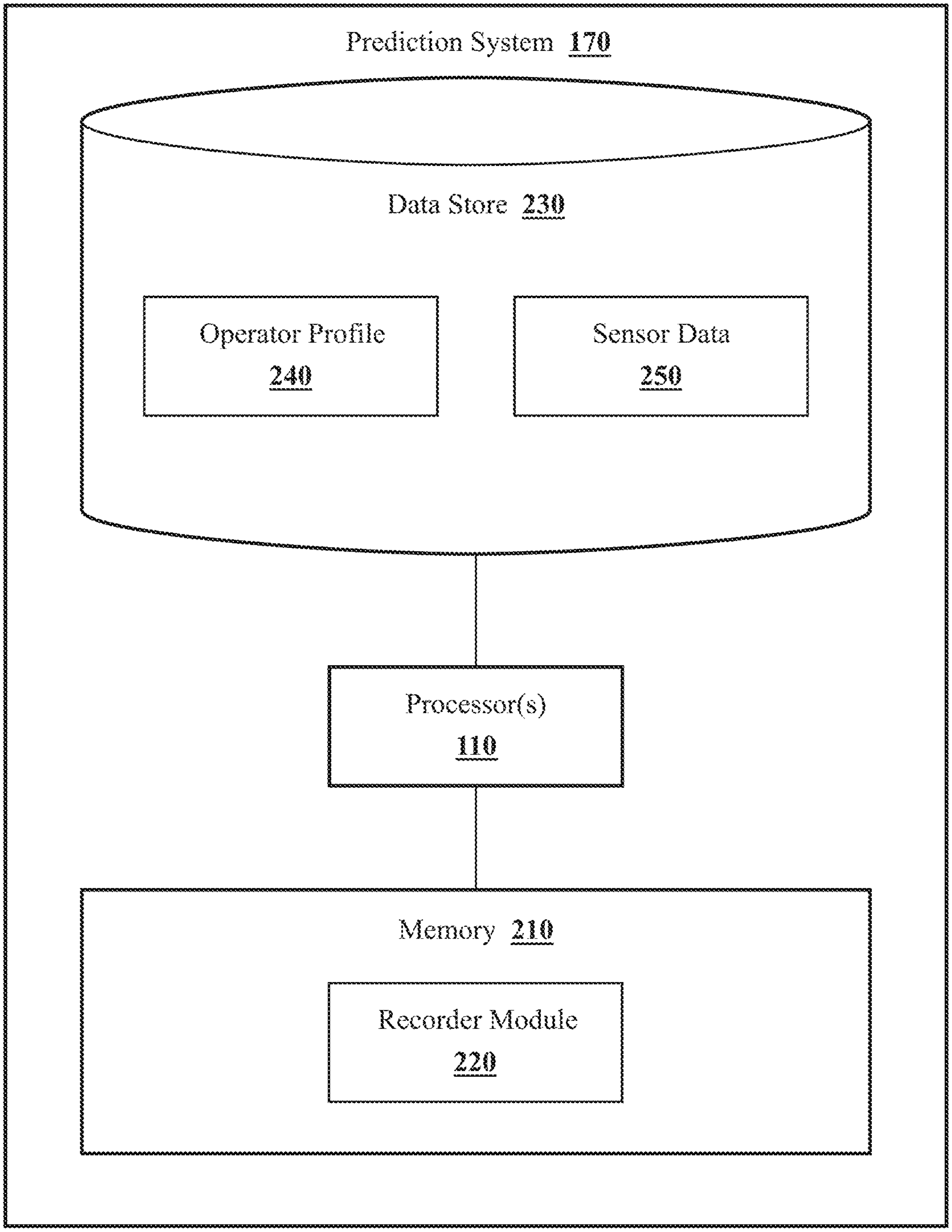
FIG. 2 illustrates one embodiment of a prediction system that is associated with generating instructions using multiple models for maneuvering on a road and adapting the instructions using multi-modal data.

With reference to FIG. 2, one embodiment of the prediction system 170 of FIG. 1 is further illustrated. The prediction system 170 is shown as including a processor(s) 110 from the vehicle 100 of FIG. 1. Accordingly, the processor (s) 110 may be a part of the prediction system 170, the prediction system 170 may include a separate processor from the processor(s) 110 of the vehicle 100, or the prediction system 170 may access the processor(s) 110 through a data bus or another communication path. In one embodiment, the prediction system 170 includes a memory 210 that stores a recorder module 220. The memory 210 is a random-access memory (RAM), a read-only memory (ROM), a hard-disk drive, a flash memory, or other suitable memory for storing the recorder module 220. The recorder module 220 is, for example, computer-readable instructions that when executed by the processor(s) 110 cause the processor (s) 110 to perform the various functions disclosed herein.

The prediction system 170 as illustrated in FIG. 2 can generally be an abstracted form of the prediction system 170 as may be implemented between the vehicle 100 and a cloud-computing environment. Furthermore, the prediction system 170 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the prediction system 170, in one embodiment, acquires sensor data 250 that includes at least camera images. In further arrangements, the prediction system 170 acquires the sensor data 250 from further sensors such as radar sensors 123, LIDAR sensors 124, and other sensors as may be suitable for identifying vehicles and locations of the vehicles.

Accordingly, the prediction system 170, in one embodiment, controls the respective sensors to provide the data inputs in the form of the sensor data 250. Additionally, while the prediction system 170 is discussed as controlling the various sensors to provide the sensor data 250, in one or more embodiments, the prediction system 170 can employ other techniques to acquire the sensor data 250 that are either active or passive. For example, the prediction system 170 passively sniffs the sensor data 250 from a stream of electronic information provided by the various sensors to further components within the vehicle 100. Moreover, the prediction system 170 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In addition to locations of surrounding vehicles, the sensor data 250 includes, for example, information about lane markings, and so on. Moreover, the prediction system 170, in one embodiment, controls the sensors to acquire the sensor data 250 about an area that encompasses 360 degrees about the vehicle 100 in order to provide a comprehensive assessment of the surrounding environment. Of course, in alternative embodiments, the prediction system 170 acquires the sensor data about a forward direction alone when, for example, the vehicle 100 is not equipped with further sensors to include additional regions about the vehicle and/or the additional regions are not scanned due to other reasons.

Moreover, in one embodiment, the prediction system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the prediction system 170 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the data store 230 further includes operator profile 240 generated and outputted by a learning model. For example, the learning model outputs the operator profile 240 using road history and an operator goal for a road during a driving scenario. As further explained below, the learning model can be a neural network, a transformer network, etc., that infers the operator profile 240 through identifying joint relationships between operator and road information. For instance, the learning model is a convolutional neural network (CNN) that performs semantic segmentation over the sensor data 250 from which further information is derived. Of course, in further aspects, the prediction system 170 may employ different machine learning algorithms or implement different approaches for performing the associated functions, which can include deep convolutional encoder-decoder architectures, or another suitable approach that generates semantic labels for the separate object classes represented in the image. In this way, the prediction system 170 can output semantic labels identifying objects represented in the sensor data 250 for communicating maneuvers along a road.

Figure 3:
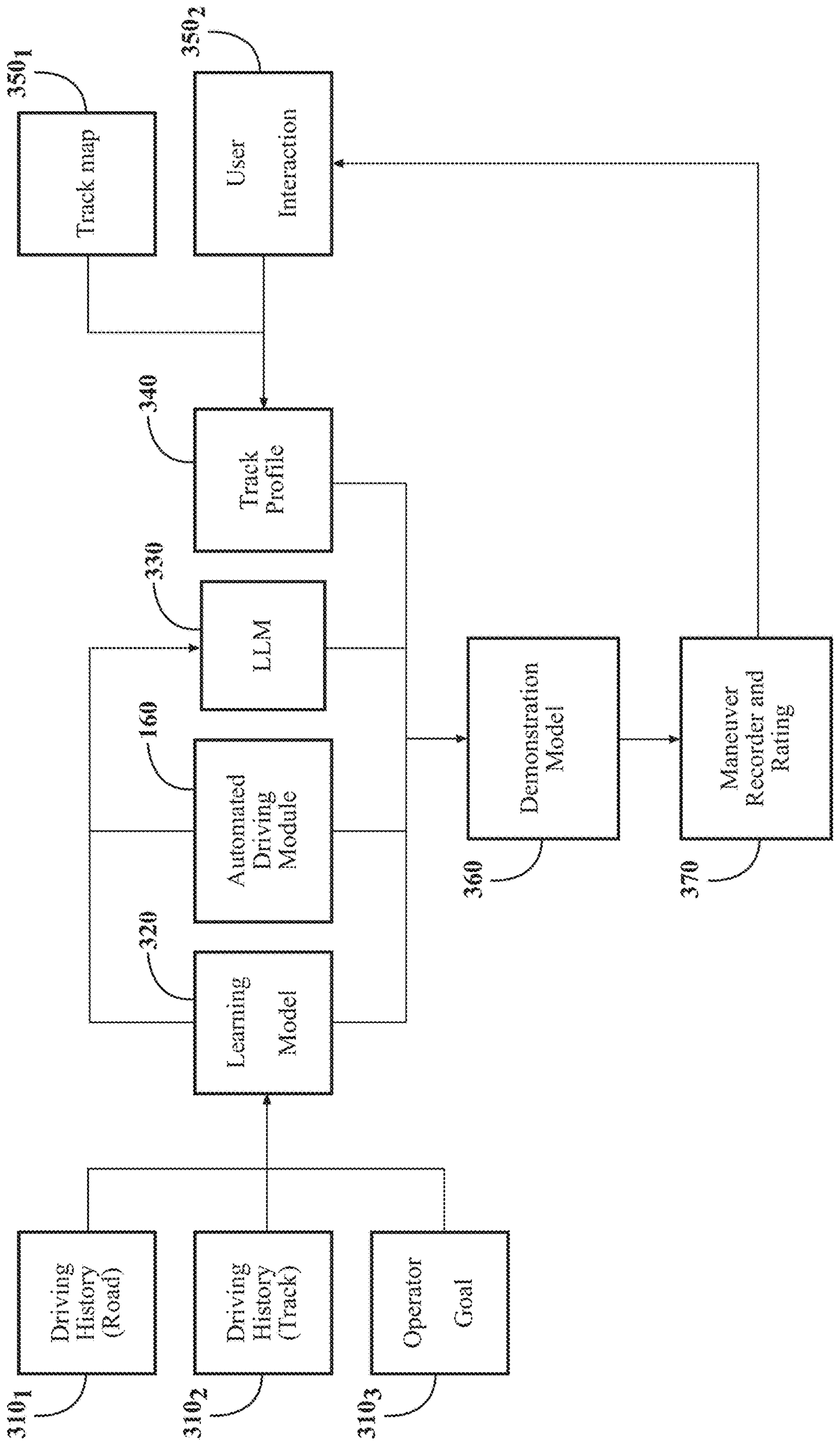
FIG. 3 illustrates one embodiment of the prediction system having multiple models that acquire driving information and an operator goal for generating vehicle maneuvers.

Now turning to FIG. 3, one embodiment of the prediction system 170 having multiple models that acquire driving information and an operator goal for generating vehicle maneuvers is illustrated. In one approach, the prediction system 170 includes instructions that cause the processor 110 to generate an operator profile by a learning model 320 using road history and an operator goal 310$_3$ for a road during a driving scenario. Here, a road can be one of a closed track, a racing track, a mountain road, a ride at an amusement park, a tour ride, a recreational ride, a simulated road, a demo lap, and part of a video game. The prediction system 170 can also estimate a driving command outputted from an ADS using the automated driving module(s) 160 and directions using a language model for the driving scenario. The driving command can be one of the steering command, the braking command, and the acceleration command.

In further examples, the driving command is associated with a driving path, a path plan, etc., for navigating the road and the driving scenario by the vehicle 100. Meanwhile, the language model can translate outputs from the learning model and the automated driving module(s) 160 into verbal, audible, etc., directions personalized for the operator. Furthermore, the prediction system 170 communicates maneuvers for the road to an operator using the driving command, the directions, the operator profile, and a track profile 340 that is adaptive. For instance, the recorder module 220 captures vehicle motion resulting from the maneuvers by the vehicle 100 and the prediction system 170 adapts the track profile 340 accordingly for additional iterations. In this way, the prediction system 170 improves operator performance of the vehicle 100 when traveling on the road while achieving the operator goal, thereby improving vehicle travel.

Moreover, the road history includes driving history (road) 310$_1$ and driving history (track) 310$_2$. This information is associated with an operator and driving behavior for a driving scenario that the prediction system 170 can factor to personalize and customize the maneuvers. Here, the driving history (road) 310$_1$ can differentiate driving behavior on a highway, a local, an urban, etc., road. Meanwhile, the driving history (track) 310$_2$ can indicate driving behavior for a track that is one of a closed track, a racing track, a demo track, etc. For example, the demo track is a course for one of design, development, racing, recreation, etc., associated with the vehicle 100. The course can be real, generated by a vehicle simulator, simulated, a game, non-racing driving, touristic driving, etc. Furthermore, the operator goal 310$_3$ may be one of reducing travel time, increasing fuel efficiency, and any other performance goal for the road and the driving scenario. In this way, the learning model 320 has diverse information for inferring and generating an operator profile that is precise and accurate for a road.

In FIG. 3, the learning model 320 can also identify embeddings from one of text, a prompt from a large language model (LLM) 330 (e.g., a generative pre-trained transformer (GPT)), and social media data associated with the operator for generating the operator profile. For instance, the social media data includes an image with features that the learning model (e.g., a transformer network, a NN, etc.) extracts and classifies using computer vision. In this way, the learning model 320 can learn to mimic the verbiage, speech, voice, etc., of the operator using the operator profile that improves the execution of the maneuvers. Thus, the learning model 320 can process multi-modal inputs for inferring the operator profile, thereby increasing system robustness through factoring diverse inputs.

Moreover, the learning model 320 can infer a demonstration style from the embeddings. The demonstration style can include a teaching style, a teacher profile, etc., tailored for the operator. For instance, the prediction system 170 trains a subspace of the learning model 320 by learning tensor representations jointly between the operator profile and the demonstration style. Here, the subspace can include sparse data about the operator profile and the demonstration style. A tensor can be generalized scalars, vectors, and matrices that describe physical and transformative features about inputted data in multiple dimensions. Through training, the learning model can match the operator profile and the demonstration style by identifying extracted features and rating the features, thereby replicating feedback from an expert driver that is personalized. For example, a feature is any one of direct, positive, relaxed, intense, etc., communication form. In this way, the prediction system 170 understands how the operator responds and interacts with different teaching styles and outputs driving parameters for the maneuvers on a road (e.g., a course, a demo lap, etc.) accordingly that are more impactful.

Concerning additional tasks by the ADS, the automated driving module(s) 160 can identify the driving command using the track profile 340 received during a driving scenario to manipulate driving habits. In an embodiment, the track profile 340 includes a track map $\mathbf{350}_1$ when the road is part of a course (e.g., a demo course) and user interactions $\mathbf{350}_2$ with the vehicle 100 fed back following the maneuvers on the road. The user interactions $\mathbf{350}_2$ can include identifying strong, weak, etc., reactions to the maneuvers for the track profile 340 to incorporate. In this way, the track profile 340 can adapt according to the user interactions $\mathbf{350}_2$ associated with the maneuvers, thereby improving system intelligence and performance.

Moreover, the LLM 330 can transform directions to manipulate verbal presentation of the directions. For example, the LLM 330 incorporates the operator profile outputted by the learning model 320 and the driving command outputted by the automated driving module(s) 160 to refine and increase the personalization of the directions. Here, the directions can be associated with tokens derived from the operator profile and the driving command used by the LLM 330 for forming a sentence. For instance, the LLM 330 completes and rearranges the tokens for text directions that are coherent and cognizant, thereby enhancing and improving personalization. In another approach, the prediction system 170 also adapts the driving command and the directions to mimic the operator using the operator profile. In this way, the prediction system 170 further personalizes the directions and improves operator adoption of the maneuvers.

In various implementations, the prediction system 170 communicating maneuvers can involve personalized and automated tasks executed by a demonstration model 360. For instance, the demonstration model 360 and the automated driving module(s) 160 control the vehicle 100 automatically for exhibiting (e.g., virtually, actually) a braking command to the operator using the road history and the operator goal during a driving scenario. This task can involve adjusting the driving command outputted by the automated driving module(s) 160 and the directions using the LLM 330 according to vehicle motion by the vehicle 100 from the maneuvers. Here, the road can be one of a closed track, a racing track, a mountain road, a ride at an amusement park, a tour ride, a recreational ride, a simulated road, a demo lap, and part of a video game. Furthermore, in one embodiment, the prediction system 170 adjusts the parameters of the learning model 320 and the automated driving module(s) 160 using feedback from the operator about the braking command. As such, the vehicle 100 can drive in a specific way as a demonstration while being tailored to the operator for changing habits involving the driving scenario. In this way, the prediction system 170 outputs expert personalization and improves iterations involving similar driving scenarios in the future.

Still referring to FIG. 3, the demonstration model 360 can select and translate vectors outputted from the learning model 320, the automated driving module(s) 160, the LLM 330, and parameters from the track profile 340 for forming the maneuvers. For instance, the demonstration model 360 translates portions of a sentence from the LLM 330 to audio that guides the operator around a track. In another approach, the guidance is communicated to another operator over a network for monitoring the vehicle 100. In this way, the prediction system 170 constructs reliable maneuvers that increase performance and safety.

For a demo track, the prediction system 170 and the demonstration model 360 can construct a demo lap for the road that is personalized using the operator profile, the driving command, and the directions. Here, the demonstration model 360 may be a driving model that is one of a model predictive control (MPC) and a reinforcement learning model. For instance, the MPC optimizes matrices using differentials for extracting trajectories and path parameters that are quantified for the vehicle 100. The demonstration model 360 can process outputs of a generalized vector from the learning model 320 for fitting parameters associated with the demo track involving various driving moments, curves, etc.

The maneuver recorder and rating 370 can process motion changes of the vehicle 100 and operator feedback (e.g., like, dislike, etc.) resulting from communicated maneuvers, a demonstrated maneuver, etc., from the demonstration model 360. Here, the ratings can be metrics from the operator and other operators associated with a track, day, time, date, etc., for a given driving scenario that can improve customization. The user interactions $\mathbf{350}_2$ can reflect an actual driving command and manual feedback inputted to the vehicle 100 following a demonstrated maneuver. As previously explained, in one approach, the prediction system 170 can modify control parameters involving any one of the track profile 340, the learning model 320, and the automated driving module(s) 160 that improve personalization for a driving scenario that is upcoming using the feedback. In this way, the system adjusts and tunes modeling for improving customization and personalization associated with training the operator.

Figure 4:
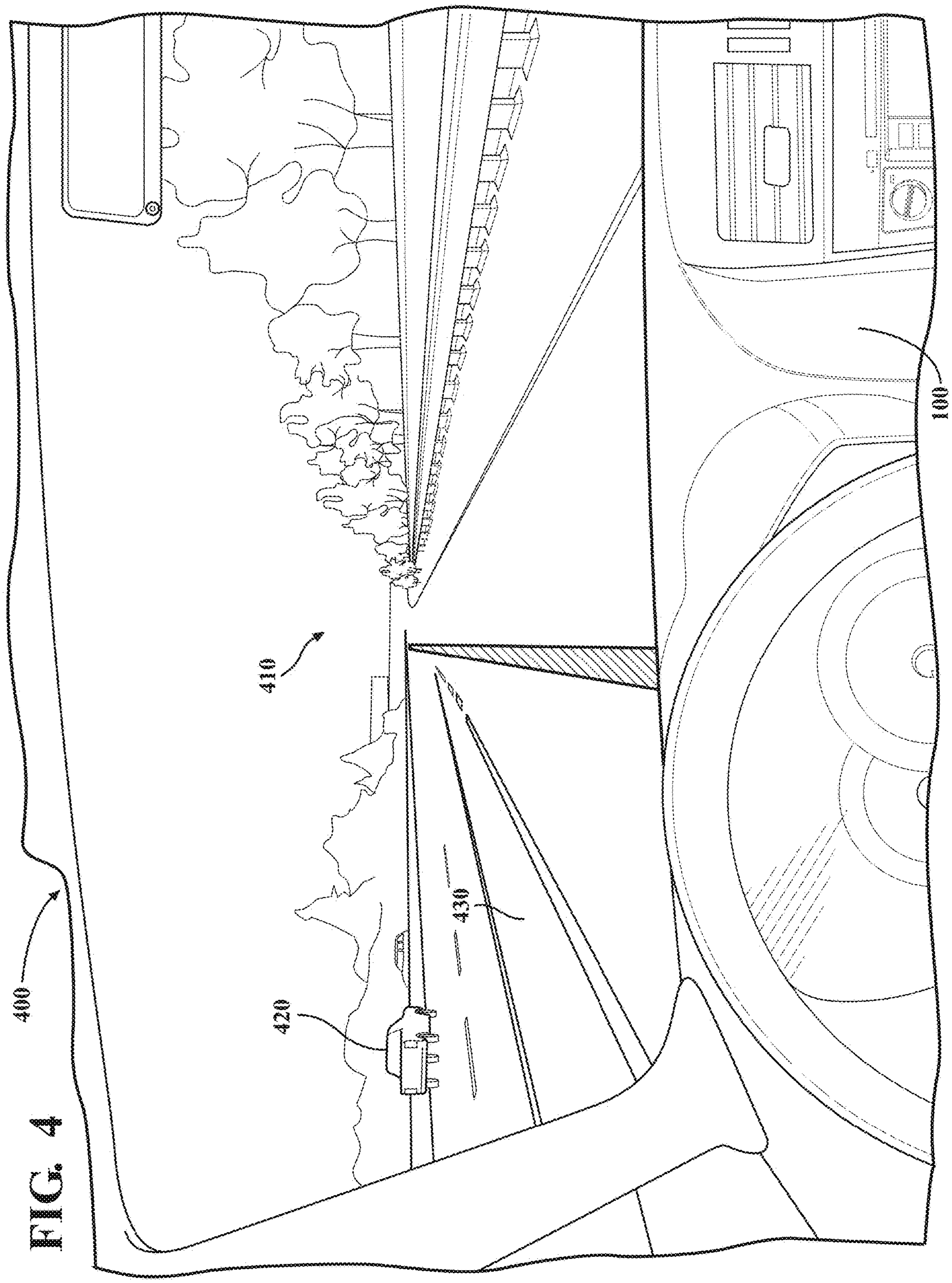
FIG. 4 illustrates an example of the prediction system implemented in a vehicle environment with the vehicle traveling on a highway and directing the operator.

Now discussing FIG. 4, an example of the prediction system 170 implemented in a vehicle environment 400 with the vehicle 100 traveling on a highway is illustrated. Here, the vehicle 100 is traveling on a road with a pick-up truck 420 within driving environment 410 that is real, simulated, virtual, etc. As in FIG. 3, the prediction system 170 can generate an operator profile using the learning model 320 according to a road history and an operator goal for the road. A driving scenario on the road can involve the vehicle 100 merging onto the highway that has the median 430. Similar to previous examples, the road can be one of a closed track, a racing track, a mountain road, a tour ride, a recreational ride, a simulated road, a demo lap, etc. The prediction system 170 can also estimate a driving command generated by an ADS using the automated driving module(s) 160 and estimate directions using the LLM 330 for the driving scenario.

Moreover, the driving command can be one of a steering command, a braking command, and an acceleration command and the driving command is associated with the vehicle 100 merging on the road either one of automatically and virtually as a demonstration. In one approach, the prediction system 170 communicates maneuvers for the road to an operator using the driving command, the directions, the operator profile, and a track profile. Accordingly, the prediction system 170 improves operator performance of the vehicle 100 when merging on the road while achieving the operator goal, thereby improving vehicle safety and performance.

Figure 5:
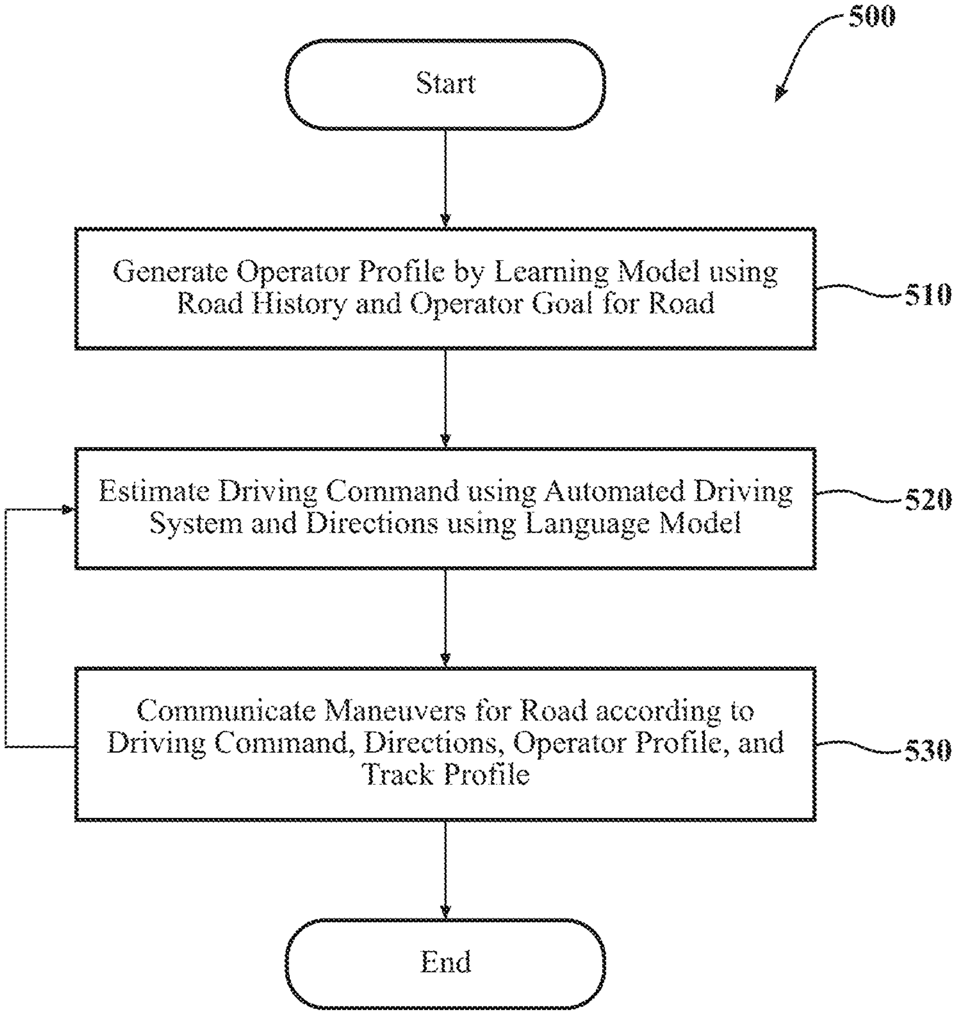
FIG. 5 illustrates one embodiment of a method that is associated with estimating a driving command using an automated driving system (ADS) and directions using a language model and communicating maneuvers to an operator using the driving command.

Regarding FIG. 5, a flowchart of a method 500 that is associated with generating instructions using multiple models for maneuvering on a road according to an operator profile and adapting the instructions using multi-modal data is illustrated. The method 500 will be discussed from the perspective of the prediction system 170 of FIGS. 1 and 2. While the method 500 is discussed in combination with the prediction system 170, it should be appreciated that the method 500 is not limited to being implemented within the prediction system 170 but is instead one example of a system that may implement the method 500.

At 510, the prediction system 170 generates an operator profile by a learning model (e.g., a transformer network, a neural network (NN), etc.) using a road history and an operator goal for a road. Here, the road can be one of a closed track, a racing track, a mountain road, a ride at an amusement park, a tour ride, a recreational ride, a simulated road, a demo lap, and part of a video game. Furthermore, the road history can include a driving history (road) and a driving history (track). As previously explained, this information can be associated with an operator and driving behavior for a driving scenario that the prediction system 170 can factor to personalize driving maneuvers and train the operator.

Moreover, the driving history (road) can differentiate driving behavior on highway, local, urban, etc., roads. Meanwhile, the driving history (track) can indicate driving behavior for a track that is one of a closed track, a racing track, a demo track, etc. For instance, the demo track is a course for one of design, development, racing, recreation, etc., associated with the vehicle 100. The course can be real, generated by a vehicle simulator, simulated, a game, non-racing driving, touristic driving, etc. Furthermore, in one approach, the operator goal can be one of reducing travel time and increasing fuel efficiency on the road. Additionally, the learning model can identify embeddings from one of text, a prompt from a LLM, and social media data associated with the operator for generating the operator profile, thereby further enhancing operator personalization.

As previously explained, in another approach, the learning model infers a demonstration style from the embeddings. The demonstration style can include a teaching style, a teacher profile, etc., tailored for the operator. Here, the learning model trains to match the operator profile and the demonstration style by identifying extracted features and rating the features. As such, the learning model can replicate feedback from an expert driver while being personalized for the operator. Thus, the learning model personalizes features using varying sources of information for inferring and generating an operator profile that is precise and accurate for the road.

At 520, the prediction system 170 estimates a driving command using an ADS and directions using a language model. Here, the ADS can utilize the automated driving module(s) 160 to output a driving command associated with a driving path, a path plan, etc., on the road. For example, the driving command is one of a steering command, a braking command, and an acceleration command recommended for a driving scenario. For customization, the language model can translate the operator profile outputted from the learning model and the driving command into verbal, audible, etc., directions personalized for the operator. Furthermore, the language model can be a LLM that transforms directions to morph and manipulate verbal presentation of the directions through integrating the operator profile outputted by the learning model with the driving command outputted by the automated driving module(s) 160. In this way, the prediction system 170 can improve operator adoption of the directions through the LLM finely tailoring personalization through features about the operator and the driving scenario derived from the operator profile and the driving command.

At 530, the prediction system 170 communicates maneuvers for a road according to the driving command, the directions, the operator profile, and a track profile. Here, the track profile can include a track map when the road is part of a course (e.g., a demo course) and user interactions, such as identifying strong, weak, etc., reactions to a maneuver at different road portions. Also, the prediction system 170 communicating maneuvers may involve personalized and automated tasks executed by a demonstration model, such as one of a MPC and a reinforcement learning model. For instance, the demonstration model and the automated driving module(s) 160 control the vehicle 100 automatically for demonstrating the braking command, the acceleration command, the steering command, etc., to the operator using the road history and the operator goal. In one approach, this operation includes the prediction system 170 adjusting the driving command outputted by the automated driving module(s) 160 and the directions using the LLM according to changing motion by the vehicle 100 from the maneuvers.

In one embodiment, the prediction system 170 adjusts parameters of the learning model and the automated driving module(s) 160 using feedback from the operator about the braking command. As such, the vehicle 100 can demonstrate driving in a way that is customized and tailored for the operator. This can involve the prediction system 170 outputting expert personalization for improving iterations involving upcoming driving scenarios that are similar. Furthermore, the demonstration model can select and translate vectors outputted from the learning model, the automated driving module(s) 160, the LLM, and the track profile for forming the maneuvers. As previously described, the demonstration model can translate portions of a sentence from the LLM to audio that guides the operator around a demo track. For instance, the demonstration model outputs a generalized vector from the learning model for fitting parameters associated with the demo track involving various curves, driving moments, driving events, etc. Accordingly, the prediction system 170 can professionally train an operator while satisfying an operator goal using multiple models and information sources by constructing reliable maneuvers that increase performance and safety.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the prediction system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140 and, thus, may be partially or fully autonomous as defined by the society of automotive engineers (SAE) levels 0 to 5.

The processor(s) 110, the prediction system 170, and/or the automated driving module(s) 160 can be operatively connected to communicate with the various vehicle systems 140 and/or individual components thereof. For example, the processor(s) 110, the prediction system 170, and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140.

The processor(s) 110, the prediction system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the prediction system 170, and/or the automated driving module(s) 160 can control the direction and/or speed of the vehicle 100. The processor(s) 110, the prediction system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A prediction system comprising:
a memory storing instructions that, when executed by a processor, cause the processor to:
generate an operator profile by a learning model using road history and an operator goal on a road during a first driving scenario for a vehicle;
estimate a driving command using an automated driving system (ADS) and estimate directions using a large language model (LLM) for the first driving scenario, wherein the LLM receives the operator profile from the learning model and the driving command from the ADS;
communicate maneuvers for the road to an operator using the driving command, the directions, the operator profile, and a track profile previously derived from a second driving scenario associated with the operator; and
control the vehicle automatically using at least the road history.

2. The prediction system of claim 1, wherein the instructions to communicate the maneuvers further include instructions to:
identify the driving command by the ADS using the track profile to manipulate driving habits;
transform the directions by the LLM to manipulate verbal presentation of the directions, wherein the directions are associated with tokens derived from the operator profile and the driving command; and
adapt the driving command and the directions to mimic the operator using the operator profile.

3. The prediction system of claim 2, wherein the instructions to generate the operator profile by the learning model further include instructions to:
identify embeddings from one of text, an LLM prompt, and social media data associated with the operator, wherein the social media data includes an image and the learning model is one of a transformer network and a neural network (NN) that processes multi-modal inputs; and
infer the operator profile and a demonstration style from the embeddings by the learning model.

4. The prediction system of claim 3 further including instructions to:
train a subspace of the learning model by learning tensor representations jointly between the operator profile and the demonstration style, wherein the subspace includes sparse data about the operator profile and the demonstration style; and
learn by the LLM to mimic the operator using the operator profile.

5. The prediction system of claim 3 further including instructions to:
construct a demo lap for the road by a driving model using the operator profile, the driving command, and the directions, wherein the driving model is one of a model predictive control (MPC) and a reinforcement learning model.

6. The prediction system of claim 1 further including instructions to:
control the vehicle automatically by the ADS for demonstrating a braking command to the operator using the road history and the operator goal, wherein the road is associated with a closed track and the ADS includes an automated driving module associated with controlling the vehicle; and
adjust parameters of the learning model and the ADS using feedback from the operator about the braking command.

7. The prediction system of claim 1, wherein the instructions to estimate the driving command further include instructions to:
adjust the driving command from the ADS and the directions using the LLM according to vehicle motion from the maneuvers;

wherein the driving command is one of a steering command, a braking command, and an acceleration command, and the driving command is associated with a driving path on the road.

8. The prediction system of claim 1, wherein:

the road is associated with one of a closed track, a racing track, a mountain road, a recreational ride, a simulated road, a demo lap, and part of a video game;

the operator goal is one of reducing travel time and increasing fuel efficiency on the road; and the track profile adapts according to user interactions associated with the maneuvers.

9. A non-transitory computer-readable medium comprising:

instructions that when executed by a processor cause the processor to:

generate an operator profile by a learning model using road history and an operator goal on a road during a first driving scenario for a vehicle;

estimate a driving command using an automated driving system (ADS) and estimate directions using a large language model (LLM) for the first driving scenario, wherein the LLM receives the operator profile from the learning model and the driving command from the ADS;

communicate maneuvers for the road to an operator using the driving command, the directions, the operator profile, and a track profile previously derived from a second driving scenario associated with the operator; and control the vehicle automatically using at least the road history.

10. The non-transitory computer-readable medium of claim 9, wherein the instructions to communicate the maneuvers further include instructions to:

identify the driving command by the ADS using the track profile to manipulate driving habits;

transform the directions by the LLM to manipulate verbal presentation of the directions, wherein the directions are associated with tokens derived from the operator profile and the driving command; and adapt the driving command and the directions to mimic the operator using the operator profile.

11. The non-transitory computer-readable medium of claim 10, wherein the instructions to generate the operator profile by the learning model further include instructions to:

identify embeddings from one of text, an LLM prompt, and social media data associated with the operator, wherein the social media data includes an image and the learning model is one of a transformer network and a neural network (NN) that processes multi-modal inputs; and infer the operator profile and a demonstration style from the embeddings by the learning model.

12. The non-transitory computer-readable medium of claim 9 further including instructions to:

control the vehicle automatically by the ADS for demonstrating a braking command to the operator using the road history and the operator goal, wherein the road is associated with a closed track and the ADS includes an automated driving module associated with controlling the vehicle; and adjust parameters of the learning model and the ADS using feedback from the operator about the braking command.

13. A method comprising:

generating an operator profile by a learning model using road history and an operator goal on a road during a first driving scenario for a vehicle;

estimating a driving command using an automated driving system (ADS) and estimating directions using a large language model (LLM) for the first driving scenario, wherein the LLM receives the operator profile from the learning model and the driving command from the ADS;

communicating maneuvers for the road to an operator using the driving command, the directions, the operator profile, and a track profile previously derived from a second driving scenario associated with the operator; and controlling the vehicle automatically using at least the road history.

14. The method of claim 13, wherein communicating the maneuvers further includes:

identifying the driving command by the ADS using the track profile to manipulate driving habits;

transforming the directions by the LLM to manipulate verbal presentation of the directions, wherein the directions are associated with tokens derived from the operator profile and the driving command; and adapting the driving command and the directions to mimic the operator using the operator profile.

15. The method of claim 14, wherein generating the operator profile by the learning model further includes:

identifying embeddings from one of text, an LLM prompt, and social media data associated with the operator, wherein the social media data includes an image and the learning model is one of a transformer network and a neural network (NN) that processes multi-modal inputs; and inferring the operator profile and a demonstration style from the embeddings by the learning model.

16. The method of claim 15 further comprising:

training a subspace of the learning model by learning tensor representations jointly between the operator profile and the demonstration style, wherein the subspace includes sparse data about the operator profile and the demonstration style; and learning by the LLM to mimic the operator using the operator profile.

17. The method of claim 15 further comprising:

constructing a demo lap for the road by a driving model using the operator profile, the driving command, and the directions, wherein the driving model is one of a model predictive control (MPC) and a reinforcement learning model.

18. The method of claim 13 further comprising:

controlling the vehicle automatically by the ADS for demonstrating a braking command to the operator using the road history and the operator goal, wherein the road is associated with a closed track and the ADS includes an automated driving module associated with controlling the vehicle; and adjusting parameters of the learning model and the ADS using feedback from the operator about the braking command.

19. The method of claim 13, wherein estimating the driving command further includes:

adjusting the driving command from the ADS and the directions using the LLM according to vehicle motion from the maneuvers;

wherein the driving command is one of a steering command, a braking command, and an acceleration command, and the driving command is associated with a driving path on the road.

20. The method of claim 13, wherein:

the road is associated with one of a closed track, a racing track, a mountain road, a recreational ride, a simulated road, a demo lap, and part of a video game;

the operator goal is one of reducing travel time and increasing fuel efficiency on the road; and the track profile adapts according to user interactions associated with the maneuvers.

* * * * *